July 10, 1951        J. LESUEUR        2,560,180

CHANGE SPEED DEVICE

Filed May 8, 1945        2 Sheets-Sheet 1

INVENTOR
J. Lesueur
BY C. F. Wenderoth
ATTORNEY

July 10, 1951  J. LESUEUR  2,560,180
CHANGE SPEED DEVICE
Filed May 8, 1945  2 Sheets-Sheet 2

INVENTOR
J. Lesueur
BY
C. F. Wenderoth
ATTORNEY

Patented July 10, 1951

2,560,180

UNITED STATES PATENT OFFICE 2,560,180

CHANGE-SPEED DEVICE

Jules Lesueur, Sevres, France

Application May 8, 1945, Serial No. 592,581
In France January 17, 1942

5 Claims. (Cl. 74—191)

The present invention relates to change speed gears of the type including rollers of substantially conical shape interposed between two elements respectively connected to the driving shaft and the driven shaft, variations of the ratio transmission being obtained by angular displacements of said rollers about axes of rotation perpendicular to their axis of symmetry.

The object of my invention is to provide a change gear of this type which is better adapted to meet the requirements of practice.

A preferred embodiment of my invention will be hereinafter described with reference to the accompanying drawings, given merely by way of example and in which.

Figure 1:
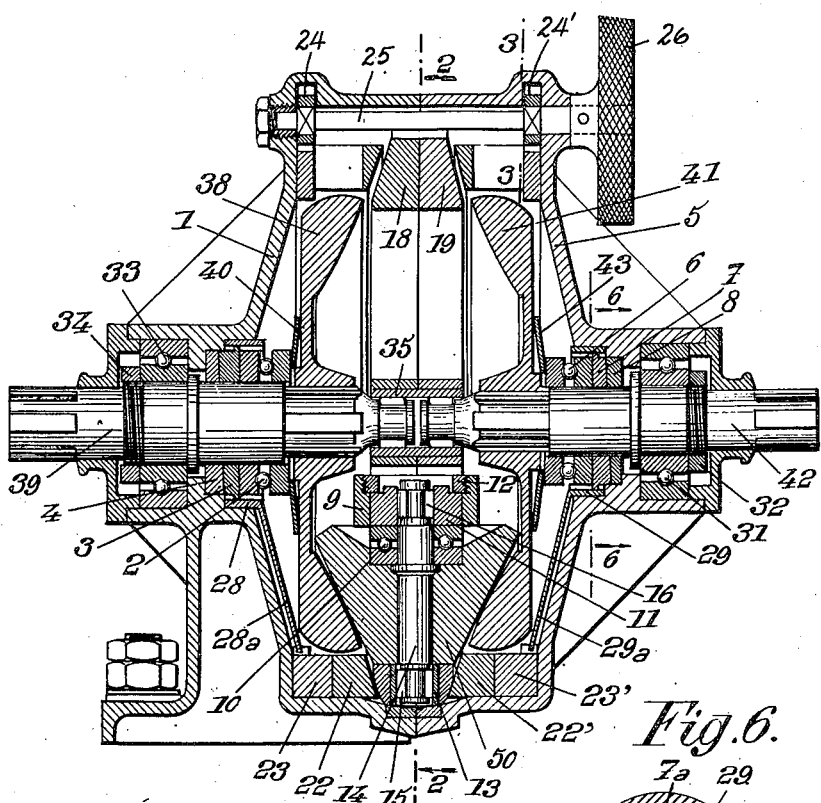
Fig. 1 is an axial sectional view, on the line 1—1 of Fig. 2, of an embodiment of my invention.
Figure 6:
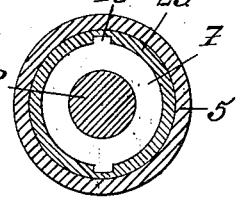
Fig. 6 is a section on the line 6—6 of Fig. 1.

On the drawings, the driven disc 38 is keyed on driven shaft 39 in such manner as to be slidable axially thereon and it is applied against the intermediate conical rollers 50 with a certain elastic pressure supplied by a washer 40 bearing against the left hand side portion (on Fig. 1) 1 of the gear frame through intermediate of a thrust ball bearing 2 and of two rings 3 and 4 the function of which will be hereinafter set forth.

In a likewise manner, driving disc 41 is slidably keyed on driving shaft 42 and it is applied against rollers 50 with an elastic pressure supplied by washer 43 bearing against the right hand side portion 5 of the gear frame through the intermediate of a thrust ball bearing 6 and of two rings 7 and 8.

The surfaces of discs 38 and 41 are bodies of revolution having slightly curvilinear generatrices while rollers 50 are in the form of truncated cone with rectilinear generatrices.

In this construction, the number of rollers 50 is three. Each roller 50 is journalled on a spindle 14 mounted through the intermediate of needle bearings 15 and 16 in rings 13 and 11 respectively, said rings being themselves carried by frames or yokes 9. Thrust bearings 10 are provided for absorbing the axial thrust exerted on said rollers. Rings 11 are fixed on yokes 9 by means of nuts 12.

Each yoke 9 is journalled through trunnions located in the plane of each spindle 14 and perpendicular to said spindle, in bearings 17 held between two annular parts 18 and 19. The central portion of the assembly 18—19 constitutes the cage of roller bearings 35 that serves to guide the inner ends of shafts 39 and 42. The outer portion of assembly 18—19 is tightly held between the two casing elements 1 and 5.

Figure 4:
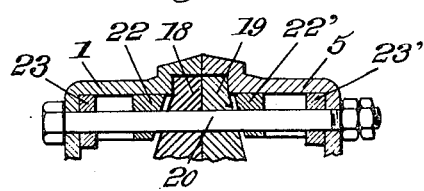
Fig. 4 is a detail view in section on the line 4—4 of Fig. 2.
Figure 2:
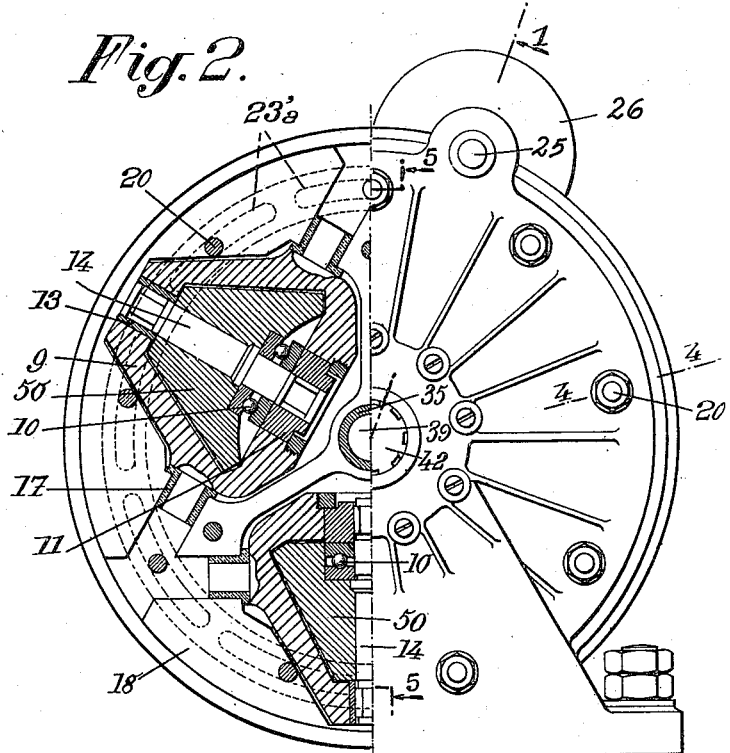
Fig. 2 shows the same embodiment, partly in side view and partly in section on the line 2—2 of Fig. 1.
Figure 3:
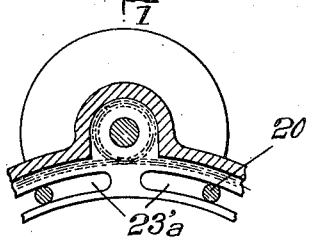
Fig. 3 is a detail view in section on the line 3—3 of Fig. 1.
Figure 5:
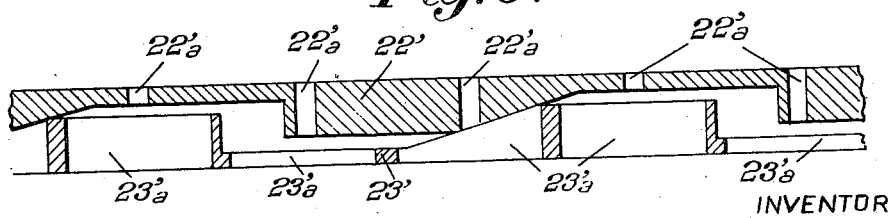
Fig. 5 is a development of a cross section along circumferential line 5—5 of Fig. 2.

The position of yokes 9 about the axes of their bearings 17 can be adjusted as follows:

The apexes of these yokes (which, as shown by Fig. 2, are of general triangular shape, with their bases in the central part and their apexes near the periphery) are held between two annular parts 22, 22' housed in casing 1—5. These annular parts are provided with holes (visible at 22'a in Fig. 5 which shows the development of part 22) through which pass, with a sliding fit, bolts 20 which serve to assemble casing portions 1 and 5 together (Fig. 4). Therefore annular parts 22, 22' can slide in casing 1—5 in the axial direction but cannot rotate therein. Between annular parts 22, 22' and the sides of casing elements 1 and 5, respectively, are interposed two other annular parts 23, 23' provided with elongated passages 23a, 23'a for bolts 20, so that they can be rotated through a certain angle about the axis of the casing. As shown by Fig. 5, the faces of annular parts 22' and 23' along which they are in contact with each other are inclined so that when part 23' is rotated (sliding displacement toward the left in Fig. 5), part 22', which is prevented by bolts 20 from rotating, is given a translatory displacement parallel to the axis of the casing. Parts 22 and 23 are similarly arranged.

The rotary displacements of parts 23, 23' are imparted thereto through a manually operated milled wheel 26 keyed on a spindle 25 carrying, fixed thereto, pinions 24, 24' in mesh with toothed portions of the periphery of said annular parts 23, 23'. Owing to this simultaneous driving of parts 23, 23', the inner annular elements 22, 22' are given simultaneously translatory displacements of the same amplitude and in the same direction and displace the apexes of yokes 9 swivelled in the interval left between said parts 22, 22'.

As a consequence of these displacements of yokes 9 rollers 50 cooperate with plates 38 and 41 along circles of different diameters, respectively, and the ratio of transmission of the gear is varied, in the known manner.

Simultaneously with this, I provide means for varying the pressures exerted by discs 38 and 41 on rollers 50.

For this purpose, ring 7 is provided with lugs 7a engaged in corresponding housings of a sleeve 29 rotatable in casing element 5. This sleeve 29 carries, rigid therewith, an arm 29a the free end of which is engaged in a notch of annular part 23. Thus ring 7 is caused to rotate together with annular part 23'. On the other hand, ring 8 is housed in fixed position in casing element 5. The adjoining faces of rings 7 and 8 are of helical shape (similarly to what has been shown concerning elements 22' and 23') so that when ring 7 is rotated (as a consequence of a rotation of annular part 23' and therefore of a modification of the gear ratio) said ring 7 is further given an axial displacement which, through bearing 6, modifies the thrust exerted by washer 43.

In a like manner, ring 2 cooperates with a sleeve 28 provided with an arm 28a driven by annular part 23, so as to modify the pressure exerted by washer 40 on disc 38 when part 23 is rotated.

Driving shaft 42 is journalled in a bearing 31 held by a nut 32. Driven shaft 39 is journalled in a bearing 33 held in position by a nut 34.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A change speed gear which comprises, in combination, a frame, a driving disc and a driven disc journalled in said frame coaxially with each other and having opposed friction surfaces, of general conical shape, of revolution about their common axis, a plurality of yokes journalled in said frame about axes located in a plane at right angles to said axis of the discs, a plurality of axles carried by said yokes at right angles to the axes thereof, a plurality of rollers of general conical shape mounted on said axles respectively, said rollers being interposed between said discs in tangential contact therewith for transmission of movement from one to the other, the generatrices of said conical disc and roller surfaces being shaped to ensure practically punctual contact of said rollers with said discs at distances from the common axis of said discs variable as a function of the inclination of the roller axes with respect to said axis of the discs, said yokes having peripheral pointed ends, two annular parts coaxial with said discs slidably mounted in said frame at a distance from each other, with the pointed ends of said yokes caught between said annular parts, and means for sliding said annular parts simultaneously in said frame parallelly to the axis of said discs.

2. A change speed gear which comprises, in combination, a frame, a driving disc and a driven disc journalled in said frame coaxially with each other and having opposed friction surfaces, of general conical shape, of revolution about their common axis, a plurality of yokes journalled in said frame about axes located in a plane at right angles to said axis of the discs, a plurality of axles carried by said yokes at right angles to the axes thereof, a plurality of rollers of general conical shape mounted on said axles respectively, said rollers being interposed between said discs in tangential contact therewith for transmission of movement from one to the other, the generatrices of said conical disc and roller surfaces being shaped to ensure practically punctual contact of said rollers with said discs at distances from the common axis of said discs variable as a function of the inclination of the roller axes with respect to said axis of the discs, said yokes having peripheral pointed ends, two annular parts coaxial with said discs slidably guided in said frame so as to be movable axially therein but to be fixed about the axis of said discs, said annular parts being mounted at a distance from each other with the pointed ends of said yokes caught between them, two other annular parts guided in said frame coaxially with the two first mentioned ones so as to be movable angularly about said axis of the discs but to be fixed in the axial direction, each of the two first mentioned annular parts being in contact with one of the two second mentioned annular parts along helical surfaces so that rotation of the two second mentioned annular parts produces axial translation of the two first mentioned annular parts, and means for rotating said second mentioned annular parts about their common axis.

3. A change speed gear which comprises, in combination, a frame, a driving disc and a driven disc journalled in said frame coaxially with each other and having opposed friction surfaces, of general conical shape, of revolution about their common axis, a plurality of yokes journalled in said frame about axes located in a plane at right angles to said axis of the discs, a plurality of axles carried by said yokes at right angles to the axes thereof, a plurality of rollers of general conical shape mounted on said axles respectively, said rollers being interposed between said discs in tangential contact therewith for transmission of movement from one to the other, the generatrices of said conical disc and roller surfaces being shaped to ensure practically punctual contact of said rollers with said discs at distances from the common axis of said discs variable as a function of the inclination of the roller axes with respect to said axis of the discs, said yokes having peripheral pointed ends, two annular parts coaxial with said discs slidably guided in said frame so as to be movable axially therein but to be fixed about the axis of said discs, said annular parts being mounted at a distance from each other with the pointed ends of said yokes caught between them, two other annular parts guided in said frame coaxially with the two first mentioned ones so as to be movable angularly about said axis of the discs but to be fixed in the axial direction, each of the two first mentioned annular parts being in contact with one of the two second mentioned annular parts along helical surfaces so that rotation of the two second mentioned annular parts produces axial translation of the two first mentioned annular parts, the two second mentioned annular parts being toothed along a portion of their periphery, a spindle journalled in said frame parallel to said axis of the discs, two pinions fixed to said spindle in mesh with said toothed portions respectively, and manual means for rotating said spindle.

4. A change speed gear which comprises, in combination, a frame, a driving disc and a driven disc journalled in said frame coaxially with each other and having opposed friction surfaces, of general conical shape, of revolution about their common axis, a plurality of yokes journalled in said frame about axes located in a plane at right angles to said axis of the discs, a plurality of axles carried by said yokes at right angles to the axes thereof, a plurality of rollers of general conical shape mounted on said axles respectively, said rollers being interposed between said discs in tangential contact therewith for transmission of movement from one to the other, the generatrices of said conical disc and roller surfaces being shaped to ensure practically punctual contact of said rollers with said discs at distances from the common axis of said discs variable as a function of the inclination of the roller axes with respect to said axis of the discs, said yokes having peripheral pointed ends, two annular parts coaxial with said discs slidably guided in said frame so as to be movable axially therein but to be fixed about the axis of said discs, said annular parts being mounted at a distance from each other with the pointed ends of said yokes caught between them, two other annular parts guided in said frame coaxially with the two first mentioned ones so as to be movable angularly about said axis of the discs but to be fixed in the axial direction, each of the two first mentioned annular parts being in contact with one of the two second mentioned annular parts along helical surfaces so that rotation of the two second mentioned annular parts produces axial translation of the two first mentioned annular parts, means for rotating said second mentioned annular parts about their common axis, and means for exerting on said discs a pressure of application thereof against said rollers variable in response to variations of the positions of said second mentioned annular members above the common axis of said discs.

5. A change speed gear which comprises, in combination, a frame, a driving disc and a driven disc journalled in said frame coaxially with each other and having opposed active surfaces, a general conical shape of revolution about their common axis, said discs being slidable relatively to each other along said common axis, elastic means for yieldingly opposing relative axial movements of said discs away from each other from a given relative position, a plurality of yokes journalled in said frame about axes located in a plane at right angles to said common axis of the discs, a plurality of axles carried by said yokes at right angles to the journal axes thereof, a plurality of rollers of general conical shape mounted on said axles respectively, said rollers being interposed between said discs in tangential contact therewith for transmission of movement from one to the other, the generatrices of said conical disc and roller surfaces being shaped to ensure practically point contact of said rollers with said discs, the axes of said yokes intersecting the geometrical surface of the rollers obliquely thereto, and control means operatively connected with said yokes for simultaneously varying angular positions of said yokes about their respective axes, whereby a rotation of each yoke about its axis from the position in which its axle is perpendicular to the common axis of the discs displaces the points of contact of the corresponding roller with the respective discs in opposed directions both on said roller and on said discs, so as both to reduce the radius of contact on one disc while increasing it on the other and correspondingly to cause, on the roller, an increase of the diameter of contact with said first mentioned disc and a reduction of the diameter of contact with said second mentioned disc.

JULES LESUEUR.

REFERENCES CITED

The following references are of record in the file of this patent:

UNITED STATES PATENTS

| Number | Name | Date |
|---|---|---|
| 844,203 | Smith | Feb. 12, 1907 |
| 1,979,170 | Nardone | Oct. 30, 1934 |
| 2,020,677 | Erban | Nov. 12, 1935 |
| 2,252,630 | Heer | Aug. 12, 1941 |

FOREIGN PATENTS

| Number | Country | Date |
|---|---|---|
| 18,626 | France | Mar. 10, 1914 |
| 446,325 | France | Sept. 30, 1912 |